Patented June 6, 1939

2,161,322

UNITED STATES PATENT OFFICE 2,161,322

C-ALIPHATIC ISOCYCLIC AMINES N-SUBSTITUTED BY OXYALIPHATIC RADICALS

Adolf Steindorff and Gerhard Balle, Frankfort-on-the-Main, Karl Horst, Hofheim in Taunus, and Heinz Schild, Frankfort-on-the-Main, Germany, assignors to I. G. Farbenindustrie Aktiengesellschaft, Frankfort-on-the-Main, Germany No Drawing. Application March 25, 1937, Serial No. 132,998. In Germany March 28, 1936

7 Claims. (Cl. 260—573)

This invention relates to the manufacture of products which have good properties of capillary action by causing a cyclic primary or secondary amino compound containing in the nucleus at least one aliphatic radical with more than 3 carbon atoms to react with an alkylene oxide or a monohalogen derivative of a polyhydric alcohol.

The new products are obtainable, for instance, by causing ethylene oxide or another alkylene oxide, for instance, propylene oxide, butylene oxide, butylene dioxide, cyclohexene oxide, glycide, epichlorhydrine, to act upon an alkylated, cyclic primary or secondary amino compound, if desired, in the presence of a catalyst such as sodium hydroxide, potassium hydroxide or sodium methylate or of an acid substance, for instance, sodium bisulfate at a raised temperature whereby one or several mols of the alkylene oxide may enter into reaction.

The compounds may also be prepared in such a way that monohalogen compounds of polyhydric alcohols, for instance, glycol, diglycol, polyglycol, glycerol, polyglycerol, are caused to act upon the amino compounds at a raised temperature and, if desired, under pressure. The reaction may also be performed several times by converting, for instance, a C-isooctyl-N-diethanol aniline by means of metallic sodium into the mono- or di-sodium compound and causing the latter to react with 1 mol or 2 mols of the halogen compound of a polyhydric alcohol at raised temperature and in the presence of an inert solvent. It is also possible to react the bodies obtainable from an amino compound and the halogen compound of a polyhydric alcohol and containing one or several hydroxyl groups with alkylene oxides.

The N-glycol or N-polyglycol compounds of the alkylated cyclic amines which contain at least once the group of the following general formula:

wherein $R_1$ stands for a member of the group consisting of H, alkyl, cycloalkyl, aryl, aralkyl, oxyalkyl, polyoxyalkyl and polyglycolether radicals;

$R_2$ stands for a member of the group consisting of oxyalkyl, polyoxyalkyl and polyglycolether radicals, the nitrogen being directly linked to a cyclic radical substituted at least once by an aliphatic radical with at least 4 carbon atoms, are oily to fat- or wax-like products whose solubility in water varies according to the character of the glycol or polyglycol radical and the number of the ethenoxy groups combined to form a polyglycol radical. The products may be insoluble in water, capable of being emulsified or water-soluble.

In case the reaction products are insoluble in water or are soluble in water only to a small extent they may be rendered water-soluble by reaction of their nitrogen group or free OH-groups which may also be present in the form of alkali alcoholates with reactive compounds, such as sulfuric acid or chloro-acetic acid. The subsequent reaction at the groups mentioned may also be performed in order to vary the effect of the products.

As such reactions there may be mentioned, for instance, the reaction with halogen carboxylic acids containing a reactive halogen atom, with halogen alkylsulfonic acids containing a reactive halogen atom, with di- or poly-basic carboxylic acids with formation of acid esters of these acids; furtherfore, esterification with polybasic inorganic acids such as, for instance, sulfuric acid or phosphoric acid. The hydroxyl group may also be esterified, for instance, with hydrochloric acid, with organic carboxylic or sulfonic acids; furthermore, by treatment with phosgene with formation of chlorocarbonic acid ester; also by the action of formaldehyde and HCl the omega-chloromethylethers may be obtained and these products may be subjected to further reactions, the halogen compound obtainable from a compound which contains an OH-group and in which OH has been exchanged for Cl or obtainable from the cation of $CH_2O$ and HCl may be caused to react with potassium cyanide and the reaction product may be saponified subsequently or a chlorocarbonic acid ester obtainable by treatment of a compound, containing an OH-group, with phosgene may be caused to react with oxyalkyl-sulfonic acids, aminoalkylsulfonic acids, aminoarylsulfonic acids aminoalkyl or aminoaryl-carboxylic acids. The said reaction products are in part oily bodies, and in part bodies of a fat- to wax- or resin-like nature; they may also be obtained as a solid pulverizable mass. In so far as they contain hydrophilic groups, they are generally water-soluble. But there are also obtained water-insoluble products.

As amino compounds there may be used: para-isobutylaniline, C-tetra-isobutylaniline, iso-octyltoluidine, iso-dodecyl-alpha-naphthylamine, di-isooctylmethylaniline, isohexyl-para-phenylenediamine, iso-octylcyclohexylamine, ar-decylal-tetrahydronaphthyl amine or the like. The said products may also contain other substituents.

Instead of the pure alkylarylamino compounds there may also be used mixtures thereof which are obtained, for instance, by using commercial parent materials.

The above mentioned amino compounds may be prepared by causing, for instance, alcohols to react upon aromatic amines in the presence of a catalyst promoting splitting off water at a raised temperature and, if desired, under pressure. A further general possibility of obtaining the said amino compounds consists in converting alkylated aromatic hydrocarbons into mono- or poly-nitro-compounds and reducing the nitro compounds in known manner by chemical means or catalytically activated hydrogen to the corresponding amino compounds.

The new products are very suitable for use in the textile and dyeing industry. They are used for washing crude textile materials as well as finished textiles from natural or artificial textile materials or for washing skins and feathers for beds. Also in the so-called dry washing process the new products may be used with a good result in combination with organic solvents. Furthermore, they are used for greasing wool, particularly in combination with a mineral oil or olein, as emulsifying and dispersing agents for all purposes in the textile and dyeing industry. They are, furthermore very good wetting and penetrating agents.

The following examples serve to illustrate the invention but they are not intended to limit it thereto, the parts being by weight:

(1) 20 parts of sodium methylate solution of 10 per cent. strength in methanol are added to 261 parts of iso-dodecyl-aniline; the methanol is removed by warming under reduced pressure. At about 100° C. to about 140° C., 660 parts of ethylene oxide are introduced. There is formed a water-soluble product of very good foaming and washing action. The action may be enhanced by peralkylating the product containing tertiary nitrogen or by transforming it in any other manner into a product containing pentavalent nitrogen. Such product may be alkylated with methyl chloride, dimethyl sulfate or aralkylated with benzyl chloride or the product may be caused to react in known manner with halogen fatty acids, the alkali salts or esters thereof.

By causing only 176 parts of ethylene oxide to act at the above temperature upon, for instance, 261 parts of dodecylaniline obtainable by condensation of benzene in the presence of di- or trivalent metals or the salts thereof with a chlorination product prepared by chlorinating a middle oil (mixture of hydrocarbons of natural petroleum or obtained by hydrogenation of coal and containing mainly 12 C atoms) and containing principally monochloro derivatives, subsequent nitration and reduction, an oil is obtained which is nearly insoluble in water and contains chiefly the product of the formula:

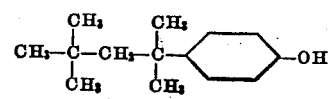

440 parts of this oil are dissolved in about 600 parts of xylene and 23 parts of sodium are introduced into the solution. With evolution of hydrogen, solution of the sodium takes place; it is advantageously accelerated by warming. While heating, 175 parts of sodium chloracetate in a suspension of xylene are introduced into the solution of the mono-sodium compound and the mixture is heated under reflux for about 6-7 hours at 125° C.–130° C. while well stirring. A product is obtained which contains chiefly the glycol ether acid in the form of the sodium salt having the formula:

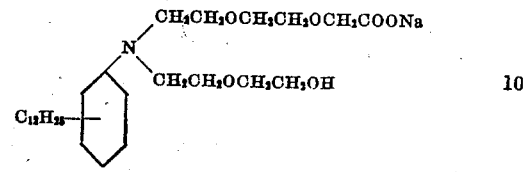

The sodium salt is a product which dissolves easily in water and forms very strongly.

(2) 25 parts of a sodium methylate solution of 8 per cent. strength are added to 235 parts of 2-methoxy-5-iso-octylaniline (obtainable by nitration of para-iso-octyl-phenolmethyl ether and subsequent reduction of the nitro-group); the methanol is removed by warming the whole under reduced pressure. At about 140° C. to about 160° C. 440 parts of ethylene oxide are introduced. A product is formed which dissolves in water and has good cleansing and strong foaming action.

From di-isobutylene and phenol there may be obtained in the presence of $AlCl_3$ or $H_2SO_4$ or borotrifluoride an iso-octylphenol of the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\underset{}{\bigcirc}-OH$$

By methylation, subsequent nitration and reduction there is obtained therefrom the 2-methoxy-5-alpha- alpha'-gamma- gamma'-tetramethyl-butylaniline.

Into 235 parts of this aniline there are introduced in the above described manner 246 parts of propylene oxide at about 160° C. to about 170° C. There is obtained an oil which is difficultly soluble in water. 480 parts of this oil are heated with 120 parts of diglycolic anhydride to 100° C.–120° C. until a test portion dissolves in dilute sodium carbonate solution to a clear solution. Thereupon, the melt is dissolved in ethyl alcohol and the alcoholic solution is neutralized by means of sodium carbonate solution; the solvent and the water are then removed under reduced pressure. There remains a tough product which is soluble in water to a clear solution.

(3) 179 parts of 2-methoxy-5-isobutylaniline and 2 parts of sodium methylate are intimately mixed and at about 150° C. to about 180° C. 370 parts of glycide are gradually added while well stirring. A product is obtained which dissolves in water to a clear solution and has a good washing and a very good foaming action. The action may be enhanced by methylating or acetylating one or more free OH-groups. Instead of the 2-methoxy-5-isobutylaniline there may also be used the 2-methoxy-5-isobutylcyclohexylamine obtainable by catalytic hydrogenation of 2-methoxy-5-isobutyl-aniline.

(4) After addition of 2.5 parts of sodium methylate 250 parts of 2-methoxy-5-iso-octyl-1,3-phenylene-diamine are brought to a total weight of 780 parts by introducing ethylene oxide at 130° C.–160° C. A product is obtained which is soluble in water and has good wetting, dispersing and cleansing action. In order to enhance the dispersing properties the product may be peralkylated.

(5) 25 parts of sodium methylate solution of 10 per cent. strength are added to 241 parts of 2-methoxy-5-iso-octyl-cyclohexylamine and, after separation of the methanol, 440 parts of ethylene oxide are introduced at 100° C.–150° C. under reduced pressure. A product is obtained which dissolves in water to a clear solution and has very good capillary action.

(6) 25 parts of sodium-methylate solution are added to 255 parts of 4-iso-octyl-2'-aminodiphenyl ether (obtainable by causing sodium para-iso-octylphenolate to react with ortho-chloronitrobenzene and subsequently reducing the nitro-group). After separation of the methanol under reduced pressure 705 parts of ethylene oxide are introduced at about 150° C.–180° C. A product is obtained which is readily soluble in water and has good washing and foaming properties.

(7) 110 parts of 2-amino-4-octylphenol and 1 part of an aqueous caustic soda solution of 35 per cent. strength are well mixed and at 120° C.–160° C. 176 parts of ethylene oxide are introduced. The product obtained is soluble in water and has a good foaming action. Already after absorption of 66 parts of ethylene oxide, the product has become soluble in water.

(8) 247 parts of 1-ethylamino-4-nonylbenzene are mixed with 10 parts of sodium methylate and 528 parts of ethylene oxide are added at 140° C.–160° C. The product which is soluble in water has a good wetting action.

By causing to react in the above described manner only 132 parts of ethylene oxide upon 247 parts of 1-ethylamino-4-nonylbenzene, an oil is obtained which is scarcely soluble in water. 397 parts of this oil are transformed into the corresponding chloride by means of 140 parts of thionylchloride. 400 parts of the chloride are transformed into the nitrile with the aid of 100 parts of potassium cyanide in alcoholic solution at about 130° C. to about 150° C. under pressure and the nitrile is saponified in known manner by heating with caustic soda solution into the ether carboxylic acid of the following formula:

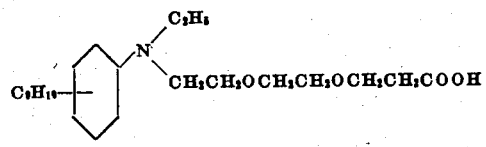

The sodium salt is soluble in water up to about 35° Herman hardness. Instead of converting the polyglycol compound by means of thionyl chloride, 379 parts of the polyglycol compound may be caused to react with paraformaldehyde and concentrated hydrochloric acid to form the chloromethyl ether. By reaction of the chloromethyl ether with a tertiary base such as pyridine, trimethylamine; triethanolamine, water - soluble products of very good foaming action are obtained.

(9) At 120° C. 257 parts of 4-octyl-2-aminonaphthalene are caused to react with 110 parts of chlorohydrine. 60 parts of sodium methylate are then introduced and at 140° C.–160° C. 704 parts of ethylene oxide are added. The product obtained has a good emulsifying action.

(10) 10 parts of sodium methylate are added to 205 parts of 1.2-dibutyl-4-aminobenzene and at 140° C.–160° C. 580 parts of propylene oxide are introduced. By subsequent treatment with chlorosulfonic acid the product is rendered soluble in water. It may be used with advantage as wetting agent.

(11) 261 parts of iso-dodecylaniline are caused to react with 440 parts of ethylene oxide in the manner described in Example 1. Into the reaction product obtained there are introduced 40 parts of NaOH dissolved in as small a quantity of water as possible. The product is then caused to react, at 105° C., with 110 parts of sodium chloracetate. The reaction product obtained may serve as washing and cleansing agent.

By causing 290 parts of propylene oxide to act upon 261 parts of dodecylaniline, as described in Example 10, an oil is obtained which is scarcely soluble in water. 550 parts of this oil are caused to react with 100 parts of phosgene advantageously in the presence of a salt-forming agent such as pyridine 600 parts of the chlorocarbonic acid ester obtained are caused to run in 1250 parts of a sodium methyl taurine solution of 15 per cent. strength at 20° C.–25° C., care being taken by simultaneous addition of caustic soda solution that the reaction mixture remains alkaline. When the reaction is finished, a paste of the methyl tauride is formed which is soluble in water to a clear solution. Instead of methyl taurine there may also be used the equivalent quantities of sodium taurine, sodium sarcosine, sodium metanilate or amino acid mixtures which are obtained by splitting albuminous substances. It is also possible to cause the chlorocarbonic acid ester to react in the manner indicated with the equivalent quantity of solid finely pulverized sodium oxyethane sulfonate in which case it is not necessary to use caustic soda solution as an agent binding hydrochloric acid.

(12) 460 parts of isohexyl-tetrahydronaphthylamine and 150 parts of 1,2-butylene oxide are heated in a closed vessel to 130° C. to 150° C. until the pressure in the vessel has fallen to 0. The oily product obtained consists mainly of the isohexyl - tetrahydro - naphthyl - mono-butanolamine.

302 parts of this amine are dissolved in 500 parts of methylenechloride and transformed into the sulfate by means of 100 parts of sulfuric acid. Thereupon, the acid sulfuric acid ester of the isohexyl - tetrahydronaphthylbutanolamine is prepared by addition of about 120–130 parts of chlorosulfonic acid at a temperature not exceeding +15° C. After neutralization, liberation of the base with the aid of caustic soda solution and removal of the solvent and the water, the sodium salt of the sulfuric acid ester is obtained as a water-soluble viscous mass.

(13) 150 parts of para-isobutylaniline of the formula:

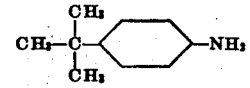

are heated to 150° C.–160° C. with 320 parts of ethylenechlorhydrine in a closed pressure vessel for several hours. The reaction mixture is stirred thoroughly with 800 parts of water. The proportion which remains undissolved is separated from the aqueous solution of the isobutylanilinehydrochloride. It consists of para-isobutyl-dioxethylaniline.

240 parts of this product are heated to about 100° C. to about 120° C. with 98 parts of maleic acid. After a short time the melt has become soluble in a sodium carbonate solution. The melt is dissolved in ethyl alcohol, the solution is neutralized with dilute sodium carbonate solution and, after evaporation of the alcohol and the water, there is obtained the sodium salt of the acid maleic acid ester of para-isobutyl-dioxethylaniline of the formula:

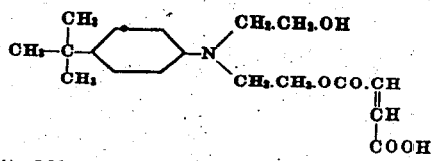

(14) 360 parts of stearoyl-aniline prepared by nitration of stearoylbenzene

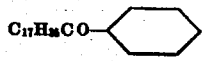

and subsequent reduction to the stearoyl-aniline.

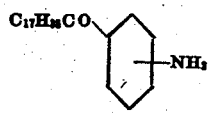

are mixed with 1.8 parts of pulverized caustic potash and the whole is heated to 150° C.-160° C., while stirring. At this temperature there are slowly introduced, pari passu with the absorption, 740 parts of glycide. The reaction product is a semi-solid, oily to fat-like mass which is soluble in water.

By causing to react under the same conditions only 150 parts of glycide, an oily product is obtained which is insoluble in water. By heating with the equivalent quantity of dimethylsulfate, a water-soluble product of the following formula is obtained:

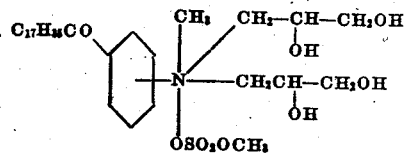

Instead of the dimethylsulfate there may also be used the equivalent quantity of benzylchloride in order to obtain a water-soluble product.

(15) 50 parts of a potassium methylate solution of 10% strength in methanol are added to 283 parts of an alkylated naphthylamine obtained by condensation of naphthalene with a monochlorination product of a petroleum fraction which chiefly contains hydrocarbons with about 10 C-atoms, nitration and reduction and the solvent is distilled under reduced pressure. The mixture is then heated in a closed vessel with 154 parts of 1,2-butylen-oxide at 150° C.-160° C. until the pressure which first existed has abated.

430 parts of the decylnaphthyldibutanolamine obtained are treated in known manner in the form of their sulfate with 120 parts of chlorosulfonic acid whereby there is obtained, after neutralization, the sodium salt of the acid sulfuric acid ester of the decylnaphthyldibutanolamine. The product is soluble in water, its aqueous solutions foam very strongly and have a good cleansing action.

(16) 295 parts of isononyldiphenylamine obtained by condensation of diphenyl in the presence of borofluoride-phosphoric acid with a fraction of propylene polymerizates which contains chiefly isononylenes, nitration and reduction, are mixed with 1 part of pulverized caustic potash and 880 parts of ethylene oxide are introduced into the mixture at 120° C-130° C. pari passu with the absorption of the ethylene oxide. The reaction occurs with considerable evolution of heat so that the whole must perhaps be cooled. The reaction finished, a soft, wax-like mass is obtained which is easily soluble in water. The product is a very good emulsifying agent for fats, oils and waxes.

(17) 465 parts of propylene oxide are introduced at 140° C.-150° C., after addition of 0.5 part of pulverized caustic soda, into 164 parts of an iso-butylphenylene diamine obtainable by condensation of benzene with isobutylene, subsequent dinitration and reduction; the gas is absorbed and there is obtained a soft fat-like product which may be emulsified in water. The product is alkylated in known manner at the nitrogen atom with the aid of dimethylsulfate. Thereby it becomes soluble in water to a clear solution and is a very good washing agent for woolen fabrics.

(18) 191 parts of hexyl-toluidine are heated to 100° C.-110° C. in a closed vessel with 88 parts of ethylene oxide. The pressure first rises and then abates to 0. The reaction product is nearly pure hexyl-dioxethyltoluidine.

By adding to the 191 parts of hexyl-toluidine 1.5 parts of pulverized caustic potash and introducing ethylene oxide at 130° C.-150° C. it is possible to obtain products with polyethylene glycol chains of increasing length; their length from each two glycol radicals on upward has practically no upper limit. Thus it is possible, to prepare polyglycol-hexyltoluidines of the following general formula:

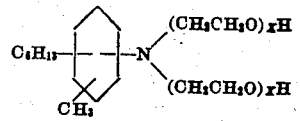

in which X may mean any whole number from 2 to about 100, this depending solely upon the quantity of the ethylene oxide used. The low polyglycol derivatives of hexyltoluidine are oily liquids which, in some cases, have a feeble tendency to form crystals and which are insoluble in water to emulsifiable. The higher polyglycol derivatives (from about X=5) are soluble in water; they are of fatty to wax-like consistency.

We claim:

1. The products containing essentially at least once the group of the following general formula:

wherein

R₁ stands for a member of the group consisting of H, alkyl, cycloalkyl, aryl, aralkyl, oxyalkyl, polyoxylalkyl and polyglycoether radicals.

R₂ stands for a member of the group consisting of oxyalkyl, polyoxylalkyl and polyglycolether radicals, the nitrogen atom being directly linked to an isocyclic hydrocarbon radical of the group consisting of a phenyl, naphthyl, cyclohexyl and tetrahydronaphthyl radical substituted at least once by an aliphatic radical containing a saturated chain with at least 4 carbon atoms, the products having the consistency of a compound belonging to the group consisting of oils, fats and waxes.

2. The products containing essentially at least once the group of the following general formula:

wherein

R₁ stands for a member of the group consisting of H, alkyl, cycloalkyl, aryl, aralkyl, oxyalkyl, polyoxyalkyl and polyglycolether radicals, $R_2$ stands for a member of the group consisting of oxyalkyl, polyoxyalkyl and polyglycolether radicals, the nitrogen atom being directly linked to a six-membered uncondensed isocyclic hydrocarbon radical substituted at least once by an aliphatic radical containing a saturated chain with at least 4 carbon atoms, the products having the consistency of a compound belonging to the group consisting of oils, fats and waxes.

3. The products of the following general formula:

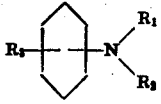

wherein $R_1$ stands for a member of the group consisting of H, alkyl, cycloalkyl, aryl, aralkyl, oxyalkyl, polyoxyalkyl and polyglycolether radical, $R_2$ stands for a member of the group consisting of oxyalkyl, polyoxyalkyl and polyglycolether radicals, $R_3$ stands for an aliphatic saturated hydrocarbon radical with at least 4 carbon atoms, the products having the consistency of a compound belonging to the group consisting of oils, fats and waxes.

4. The products of the following general formula:

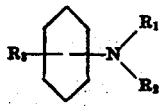

wherein $R_1$ stands for a member of the group consisting of alkyl and polyglycolether radicals, $R_2$ stands for a polyglycolether radical, $R_3$ stands for an alkyl radical with at least 4 carbon atoms, the products having the consistency of a compound belonging to the group consisting of oils, fats and waxes.

5. The products of the following general formula:

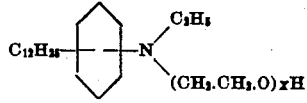

wherein X stands for a figure of the group 2 to 10, the products having the consistency of a compound belonging to the group consisting of oils and fats.

6. The products of the following general formula:

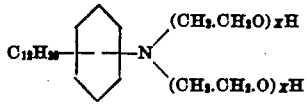

wherein X stands for a figure of the group 2 to 10, the products having the consistency of a compound belonging to the group consisting of oils and fats.

7. The mixture of products each component of said mixture having the following general formula:

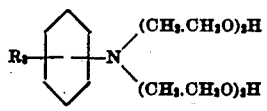

wherein $R_3$ stands for a saturated alkyl radical containing from 10 to 15 carbon atoms, the products having the consistency of a compound belonging to the group consisting of oils and fats.

ADOLF STEINDORFF.
GERHARD BALLE.
KARL HORST.
HEINZ SCHILD.